United States Patent [19]

Nakagome et al.

[11] Patent Number: 4,599,866
[45] Date of Patent: Jul. 15, 1986

[54] MAGNETIC REFRIGERATOR

[75] Inventors: Hideki Nakagome, Yokohama; Satoshi Yasuda, Kawasaki, both of Japan

[73] Assignee: Kabushiki Kaisha Toshiba, Kawasaki, Japan

[21] Appl. No.: 739,277

[22] Filed: May 30, 1985

[30] Foreign Application Priority Data

Jun. 5, 1984 [JP] Japan .................................. 59-114901

[51] Int. Cl.$^4$ ............................................ F25B 21/02
[52] U.S. Cl. ........................................................ 62/3
[58] Field of Search ...................................... 62/3, 467

[56] References Cited

U.S. PATENT DOCUMENTS

| | | | |
|---|---|---|---|
| 4,033,734 | 7/1977 | Steyert, Jr. et al. | 62/3 |
| 4,107,935 | 8/1978 | Steyert, Jr. | 62/3 |
| 4,507,927 | 4/1985 | Barclay | 62/3 |

OTHER PUBLICATIONS

Dean L. Johnson, "Reciprocating Magnetic Refrigerator", NBS Cryocooler Conference 1985.

Primary Examiner—Lloyd L. King
Attorney, Agent, or Firm—Oblon, Fisher, Spivak, McClelland & Maier

[57] ABSTRACT

A magnetic refrigerator includes a plurality of working substances each of which, when it is within a magnetic field, generates heat and, when it is outside the magnetic field, absorbs the heat to permit a gas to be condensed on the outer surface of the working substance. The working substance has even surfaces and an uneven surface formed on said outer surface thereof. A heat elimination system which, only when the working substance is within the magnetic field, contacts the even surfaces of the working substance to take the heat from the working substance, is provided.

12 Claims, 5 Drawing Figures

MAGNETIC REFRIGERATOR

BACKGROUND OF THE INVENTION

This invention relates to a magnetic refrigerator utilizing the magnetocaloric effect.

A magnetic refrigerator of this type is adapted to condense a gas with a magnetic substance which is cooled by adiabatic demagnetization. This magnetic refrigerator has an excellent refrigeration power per unit volume over an ordinary compression type refrigerator.

The magnetic refrigerator requires two alternate heat exchange processes: a heat elimination process for quickly moving a magnetic substance (a working substance), such as a gadolinium-gallium-garnet structure, into a magnetic field to permit it to be adiabatically magnetized and for causing heat generated in the working substance to be dissipated towards the outside and a heat absorption process for quickly moving the working substance away from the magnetic field to cause it to be adiabatically demagnetized so that a gas may be condensed by resultant heat absorption.

Therefore, the refrigeration coefficient and power of the magnetic refrigerator are greatly influenced by a heat exchange coefficient at the adiabatic magnetization time (heat dissipation at high temperature) and adiabatic demagnetization time (heat absorption at low temperature). In order to enhance the refrigeration coefficient and power, it has been necessary to eliminate heat, which is generated in the working substance at the time of heat elimination at high temperature, as quickly as possible to pre-cool the working substance to a required low temperature, or it has been necessary to condense a greater amount of gas at a time of heat absorption at low temperature. Therefore, a trade-off is involved therebetween, if viewed from the standpoint of the working substance. That is, a working substance of a greater area is required if a greater amount of gas at a time is condensed at the time of heat absorption at low temperature. However, a gadolinium-gallium-garnet structure, a typical working substance, is a single crystal and it is generally difficult to obtain a greater-diameter and greater-area single crystal. It is therefore necessary to provide an uneven surface to a smaller-diameter and smaller-area working substance and thus to increase the surface area. In order to improve the heat exchange efficiency at the time of heat elimination at high temperature, it is required that a heat conductor for heat dissipation be placed in intimate contact with the working substance. For a working substance of an uneven surface, however, difficulty is encountered in placing it in intimate contact with such a heat conductor. It is therefore impossible to satisfy two such demands simultaneously. In this magnetic refrigerator, an improvement is desired to lower the refrigeration efficiency and power.

SUMMARY OF THE INVENTION

It is accordingly the object of this invention to provide a magnetic refrigerator which greatly improves the refrigeration efficiency and power.

According to this invention there is provided a magnetic refrigerator comprising (a) a working substance which generates heat when it is within a magnetic field generated at a magnetic field generator, and absorbs the heat, when it is outside the magnetic field, to permit a gas to be condensed onto the outer surface of the working substance, and (b) a heat elimination system adapted to face the working substance so that it is heat-conductively coupled to the working substance to take the heat from the material, when the working substance is within the magnetic field. The heat elimination system is in thermal contact with the even surfaces of the working substance, but not in contact with that uneven surface of the working substance where condensation occurs.

The working substance and heat elimination system are placed preferably in elastic contact with each other, but this invention is not restricted thereto. That is, even if the working substance is somewhat spaced away from the heat elimination system, it is still possible to obtain excellent heat conductivity due to a very low temperature involved therebetween. In this connection it is to be noted that, if the heat elimination system merely faces the uneven surface of the working substance, the heat conductivity involved in this case is considerably lowered and thus is undesirable from the practical viewpoint.

In the magnetic refrigerator so constructed, the even and uneven surfaces are formed on the working substance and a gas is condensed on the uneven surface of the working substance while a heat elimination occurs through the even surface of the working substance.

DETAILED DESCRIPTION OF THE PREFERRED EMBODIMENTS

The embodiment of this invention will now be explained below by referring to the accompanying drawings.

Figure 1:
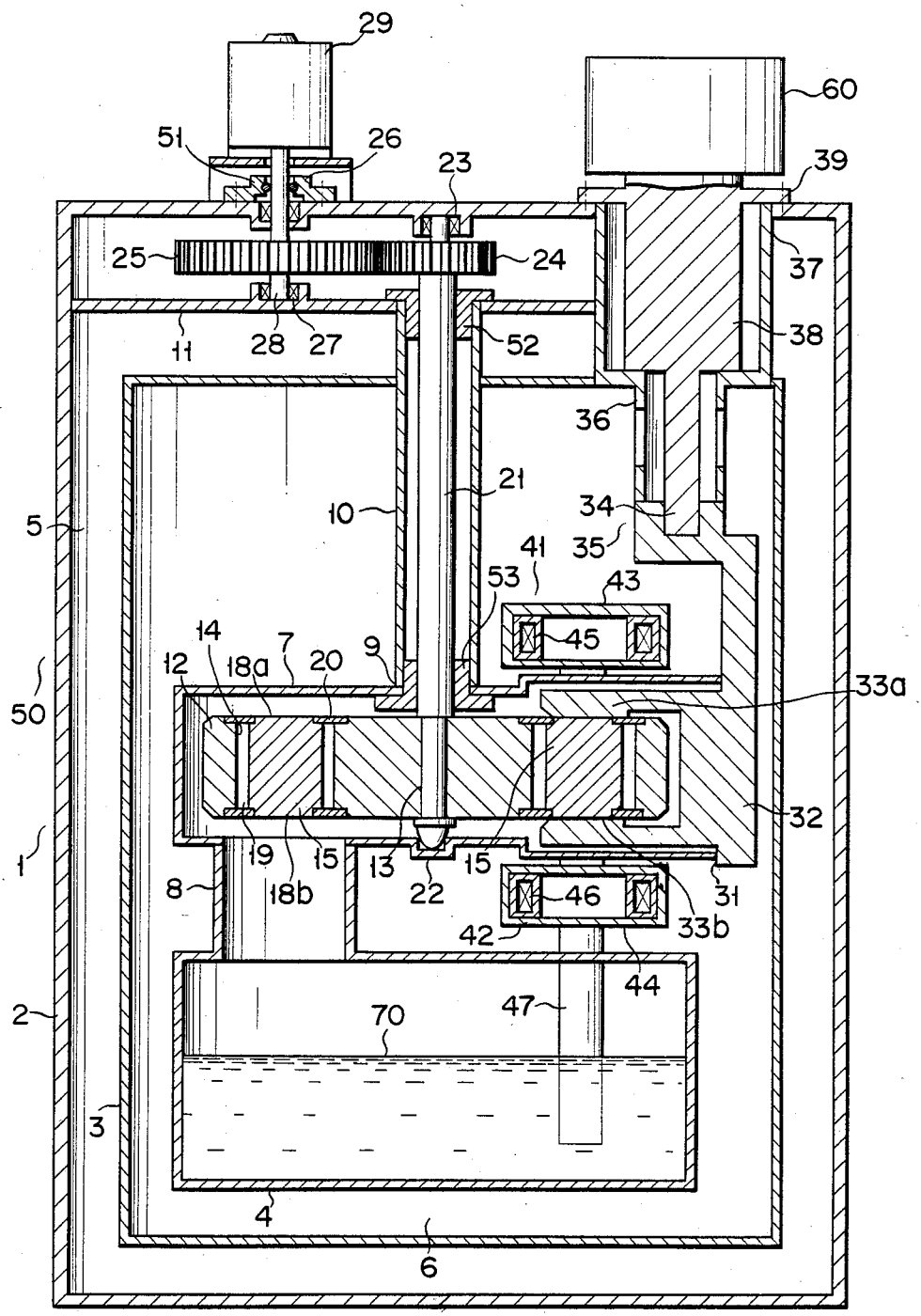
FIG. 1 is a longitudinal cross-sectional view showing a helium liquefier, incorporating therein a magnetic refrigerator according to one embodiment of this invention.
Figure 2:
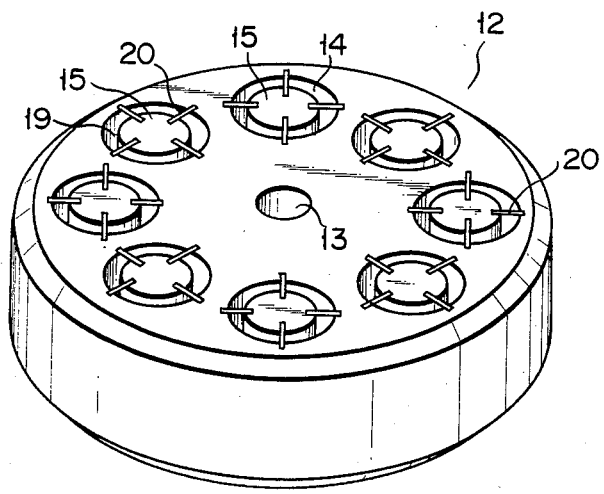
FIG. 2 is a perspective view showing a rotating member of the helium liquefier.

FIG. 1 shows a magnetic refrigerator of this invention which is incorporated in a helium liquefier and generally comprises a liquefier body 50 and a precooler 60. The general arrangement of the liquefier body 50 is as follows:

In FIG. 1, a helium tank as indicated by reference numeral 1 comprises an outer tank 2, an inner tank 3 held within the outer tank 2 with a predetermined spacing left with respect to the outer tank 2 and a helium container 4 located within the inner tank 3 with a predetermined spacing left relative to the inner tank 3. A spacing 5 around the inner tank 3 and a spacing 6 around the helium container 4 are vacuum-sucked by a vacuum pump not shown to provide vacuum, heat-insulating layers, respectively. The outer tank 2, inner tank 3 and helium container 4 are each formed of a cylindrical member made of a non-magnetic, poor heat-conducting material. Above the helium container 4, an auxiliary container 7 of a flat disk-like, outer configuration is horizontally located with a center shaft perpendicular to the container 7. It is preferred that the auxiliary container 7 be located concentric with the helium container 4. An upright, cylindrical member 8 permits a connection between the auxiliary container 7 and the helium container 4 in an eccentric relation. A groove means or an inclined surface is formed at the lower surface of the auxiliary container 7 to permit liquid helium as set out below to be conducted back into the helium container 4 through the upright member 8. A circular hole 9 is formed at the center of the upper wall of the auxiliary container 7 and an upright, cylindrical member 10 is hermetically sealed at its lower end to the edge portion of the hole 9. The upper end of the cylindrical member 10 extends hermetically through the upper wall of the inner tank 3 and through a horizontal, partition wall 11 which is horizontally formed at the upper spacing of the outer tank 2.

Figure 3:
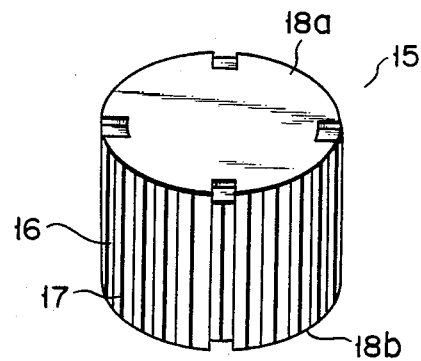
FIG. 3 is a perspective view showing a working substance incorporated in the liquefier.

A rotating member 12 is disposed within the auxiliary container 7 such that it is rotatable with the center axis located perpendicular thereto. The rotating member 12 is formed into a disk-like, outer configuration having an outer diameter somewhat smaller than an inner diameter of the auxiliary container 7, noting that the member 12 is made of a nonmagnetic material with a poor heat conductivity. A perpendicular through hole 13 is formed at the center of the rotating member and a plurality of through holes 14 (18 holes in this embodiment) are provided, at an equal interval, at the marginal edge portion of the rotating member. The through hole 14 is circular in cross-section and has an inner diameter, smaller than the inner diameter of the upright member 8, with a working substance 15 filled therein. The working substance 15 is formed into a cylindrical mass of, for example, a single crystal of Gd-Ga garnet and has a diameter somewhat smaller than that of the through hole 14 and an axial length substantially equal to the thickness of the rotating member 12. The cylindrical mass of the working substance 15 has a number of vertical, narrow grooves 17 of 5 to 1500 μm in depth with a triangular cross-section to form an uneven surface 16 and upper and lower flat or even surfaces 18a and 18b as shown in FIG. 3, noting that the vertical grooves are formed on the outer peripheral surface of the cylindrical mass. The cylindrical mass of the working substance is fixed at the marginal edge portion of the upper and lower surfaces to the rotating member 12 through supporting means 20 with an annular gap 19 left between the cylindrical mass and the inner surface of the respective hole 14. Recesses are provided at the marginal edge portions of the upper and lower even end surfaces 18a and 18b of the cylindrical mass of the working substance 15 and at the upper and lower surfaces of the rotating member 12 and the supporting means 20 has both its ends completely fitted one in the recess of the cylindrical mass and one in the corresponding recess of the rotating member so that the supporting means 20 do not extend beyond the upper and lower surfaces of the cylindrical mass of the working substance and upper and lower surfaces of the rotating member 12.

A shaft 21 is inserted through the center hole 13 of the rotating member 12 with its lower end extending beyond the lower end surface of the rotating member 12 to provide a pivot shaft section. The pivot shaft section is supported at a bearing section 22, i.e., at a recess formed in the inner surface of the bottom of the auxiliary container 7. The upper end of the shaft 21 extends up through the upright cylindrical member 10 and is supported by a bearing 23 which is provided at the inner surface of the upper wall of the outer tank 2. A gear 24 is provided at a spacing between the upper wall of the outer tank 2 and the partition wall 11 such that it surrounds the shaft 21. The gear 24 is provided in mesh with a gear 25 which is fixed to a shaft 28. The shaft 28 is supported by bearings 26 and 27 such that it is free to rotate, noting that the bearing 26 is provided on the upper wall of the outer tank and that the bearing 27 is provided on the upper surface of the partition wall 11. The upper end of the shaft 28 extends up through the upper wall of the outer tank 2 and is coupled to a motor 29 which is fixed to the outer surface of the upper wall of the outer tank 2.

An opening 31 is provided in the side wall opposite to that side wall of the container 7 which is located near the cylindrical member 8. A heat conductor 32 is made of a non-magnetic, good heat conductor, such as copper, and inserted in the container 7 through the opening 31 such that it is hermetically sealed there. Heat-absorbing sliding sections 33a and 33b are provided at that portion of the heat conductor 32 which is inserted into the auxiliary container 7, and are elastically slidable on the upper and lower surfaces 18a and 18b of the cylindrical mass of the working substance 15. The sliding sections may be formed with a proper choice of its material and its thickness so that they may have their own elasticity. The sliding sections may be so formed as to be elastically urged by, for example, a spring means. The major portion of the heat conductor 32, which is located outside the auxiliary container 7, extends up within the inner tank 3 to reach a predetermined level. A connecting section 35 is formed at the end of the upward extension of the heat conductor 32 and has a cylindrical, upwardly open recess 34. A cylindrical member 36 is connected at its lower end to the marginal edge portion of the upper end of the connecting section 35 and at its upper end to the inner surface of a hole 37 in a hermetically-sealed fashion after extending through the upper wall of the inner tank 3 in a hermetically-sealed fashion, the hole 37 being formed in the upper wall of the outer tank 2. A heat-absorbing conductor 38 of the precooler 60 is inserted into the cylindrical member 36 such that the lower end of the heat-absorbing conductor 38 is fitted into the recess 34. A flange portion 39 is formed on the outer periphery of the heat-absorbing conductor 38 and is fixed to the upper wall of the outer tank 2 through a seal material not shown, whereby the cylindrical member 36 is hermetically seated at its open end and, at the same time, the precooler 60 is fixed there.

Figure 4:
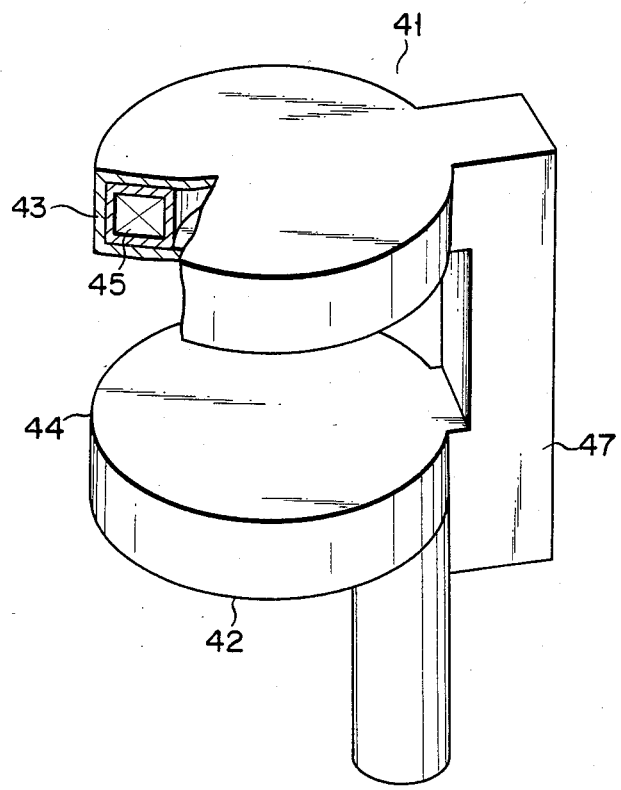
FIG. 4 is a perspective view, partially in cross-section, showing a superconducting coil incorporated in the liquefier.

A pair of superconducting coils 41, 42, which act as a magnetic field generator, are coaxially located one opposite the sliding portion 33a and one opposite the sliding portion 33b of the heat conductor 32 with the coil 41 above and the coil 42 below the auxiliary container 7. The coil 41 comprises a flat case 43 of a non-magnetic, good heat conducting material and a coil unit 45 held within the case 43 and the coil 42 comprises a flat case 44 of the same material as that of the case 43 and a coil unit 46 held within the case 44. As shown in FIG. 4, the cases 43 and 44 are coupled to each other through a good heat conducting section 47. The lower end of the conducting section 47 extends through the upper wall of the container 4 in a hermetically sealed fashion and is inserted in liquid helium 70 held in the helium container 4. That is, the coil units 45 and 46 are cooled to a required temperature through the conducting section 47 and cases 43 and 44 with the liquid helium 70 in the helium container 4 as a source for cooling.

In FIG. 1, reference numerals 51, 52 and 53 show seal means.

The operation of the helium liquefier will now be explained below in more detail.

Now suppose that the coil units 45 and 46 of the superconducting coils 41 and 42 are cooled to a predetermined temperature and that a persistent current flows through the coil units 45 and 46 with the magnetic fields generated in the same direction. With the precooler operating, the heat conductor 32 is adequately cooled to a low temperature through the heat-absorbing conductor 38. When the motor 29 is operated, the shaft 21 is rotated, causing the rotating member 12 to be rotated so that the respective working substance 15 is moved along one circular path with the shaft 21 as a center and thus passes across the magnetic field of the superconducting coils 41 and 42. When the working substance 15 enters into the magnetic field, the magnetic flux passes through the working substance 15, that is, from one end to the other end of the cylindrical mass of the working substance to permit the working substance to generate heat with an adiabatically magnetized state. When, on the other hand, the magnetic substance leaves the magnetic field, the working substance 15 absorbs the heat with an adiabatically demagnetized state.

It the adiabatically demagnetized state of the working substance, helium gas wafting above the liquid helium into the auxiliary container 7 is condensed on the surface of the cylindrical mass of the working substance 15. The liquid drops condensed on the surface of the working substance fall down into the liquid helium, permitting the liquefaction of the helium. Since a number of longitudinal grooves 17 are formed on the outer peripheral surface 16 of the respective working substance 15 to provide a larger surface area to the respective working substance 15, a greater amount of drops can be produced at a single heat-absorbing step.

On the other hand, heat generated in the working substance 15 at the adiabatically magnetized state of the substance is conducted to the outside as follows:

When the working substance 15 is within the magnetic field, the sliding sections 33a and 33b of the heat conductor 32 are necessarily in contact with the upper and lower ends of the cylindrical mass of the working substance 15, causing the heat which is generated at the working substance 15 to be transmitted from the sliding sections 33a, 33b to the major portion of the heat conductor 32 so that it is rapidly dissipated into the precooler 60 through the heat-absorbing conductor 38. In this connection it is to be noted that, since the upper and lower surfaces 18a and 18b of the cylindrical mass of the working substance 15 provide the flat surfaces, a thermal resistance between the working substance 15 and the sliding sections 33a and 33b of the heat conductor 32 can be reduced to a sufficiently low extent. As a result, the interior of the helium container 4 is prevented from being raised in temperature by the heat evolved in the working substance 15 and thus the working substance 15 is normally pre-cooled to a predetermined low temperature level, thus assuring a better cooling cycle.

This invention is not restricted to the above-mentioned embodiment and can be changed or modified in a variety of ways.

Although in the above-mentioned embodiment the working substances are moved with the rotating member rotating, the magnet field generator and heat conductor may be so designed as to be moved with the working substance fixed.

Figure 5:
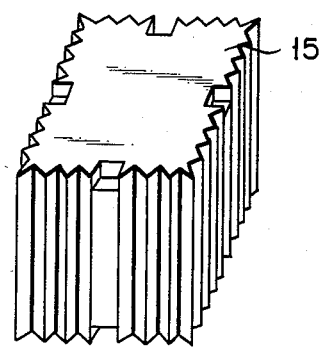
FIG. 5 is a perspective view showing a modified form of a working substance.

The working substance can be so formed as to have not only the cylindrical configuration as set out above but also the other configurations, such as a quadratic prism as shown, for example, in FIG. 5. In the working substance as shown in FIG. 5, a number of such working substance units can be arranged in high density at a support member, such as the rotating member, because the distance between the working substances 15 can be decreased.

The working substance is formed to have such a vertically grooved, outer peripheral surface as shown in FIGS. 3 and 5, but this invention is not restricted thereto, though preferably being of such a type as set out above from the standpoint of a ready drop of the condensed water down into the helium container. The working substance may have grooves of the other configuration at the outer periphery, such as grooves circular in cross-section.

What is claimed is:

1. A magnetic refrigerator comprising:
   a magnetic field generator adapted to normally generate a magnetic field;
   at least one working substance which generates heat when it is within the magnetic field and absorbs the heat, when it is outside the magnetic field, to cause a gas to be condensed;
   drive means for relatively moving the working substance and magnetic field generator to permit the working substance to alternately enter and leave the magnetic field; and
   a heat elimination system adapted to permit the generated heat to be dissipated into the outside from the working substance, when the working substance enters the magnetic field,
   the improvement in which
   said working substance has a pair of opposite, flat surfaces and a grooved, outer peripheral surface where the gas is deposited to permit condensation, and
   said heat elimination system includes a heat conductor which, when the working substance enters the magnetic field, contacts both the flat surfaces of the working substance to permit the generated heat to be taken from the working substance and, when it is outside the magnetic field, is not in contact with the flat surfaces of the working substance.

2. A magnetic refrigerator according to claim 1, which further comprises a support for supporting a plurality of working substances and in which said drive means includes a drive mechanism for moving the support to permit the working substance to alternately enter and leave the magnetic field.

3. A magnetic refrigerator according to claim 2, which further includes means for fixing said magnetic field generator and said heat conductor in place.

4. A magnetic refrigerator according to claim 3, in which said support has a rotatable disk member, the disk member having a plurality of through holes formed at a predetermined interval at the marginal edge portion with its rotation axis as a center, the working substance being held in the through hole of said disk member.

5. A magnetic refrigerator according to claim 4, in which said through hole of said disk member has a diameter somewhat greater than the outer diameter of said working substance with a gap left between the inner wall of the through hole and the outer peripheral surface of said working substance.

6. A magnetic refrigerator according to claim 5, in which both the end surfaces of said working substance are in a plane substantially the same as the surface of said disk member.

7. A magnetic refrigerator according to claim 6, in which said working substance has a number of grooves on the outer peripheral surface thereof to provide an uneven surface to the working substance.

8. A magnetic refrigerator according to claim 7, in which said grooves are formed in great number such that they extend in the axial direction of said working substance with the respective grooves spaced apart on the whole outer peripheral surface of the working substance.

9. A magnetic refrigerator according to claim 8, in which said working substance is formed to have a cylindrical mass.

10. A magnetic refrigerator according to claim 8, in which said working substance is formed to have a quadratic mass.

11. A magnetic refrigerator comprising:

a container having an opening at its upper wall and holding a liquid to be cooled;

a magnetic field generator fixed at the upper side of the container and adapted to normally generate a magnetic field;

an auxiliary container disposed above said container and communicating with said container through said opening;

a working substance movable in a horizontal plane within the auxiliary container and adapted to generate heat when it is within the magnetic field and absorb the heat, when it is outside the magnetic field, to permit a gas to be condensed on the outer surface thereof, said working substance having even and uneven surfaces on which a gas is condensed;

drive means for moving the working substance to permit it to alternately enter and leave the magnetic field; and a heat elimination system which, when the working substance is within the magnetic field, permits the heat which is generated in the working substance to be dissipated toward the outside of the auxiliary container, said heat elimination system including a heat conductor which, when said working substance is within the magnetic field, contacts the even surface of the working substance to take the heat from the working substance and, when said working substance is outside the magnetic field, does not contact them.

12. A magnetic refrigerator including a working substance of a type which generates heat when positioned within a magnetic field and absorbs heat when positioned outside said magnetic field to permit a gas to be condensed on the outer surface of the working substance, the exterior of said working substance comprising even and uneven surfaces, and a heat elimination system having means for facing the even surface of the working substance to take the heat from the working substance only when said working substance is in said magnetic field.

* * * * *